United States Patent
Cosatto (10) Patent No.: US 12,288,325 B2
(45) Date of Patent: Apr. 29, 2025

(54) TUMOR CELL ISOLINES

(71) Applicant: NEC Laboratories America, Inc., Princeton, NJ (US)

(72) Inventor: Eric Cosatto, Red Bank, NJ (US)

(73) Assignee: NEC Corporation, Tokyo (JP)

( * ) Notice: Subject to any disclaimer, the term of this patent is extended or adjusted under 35 U.S.C. 154(b) by 491 days.

(21) Appl. No.: 17/711,475

(22) Filed: Apr. 1, 2022

(65) Prior Publication Data
US 2022/0319002 A1    Oct. 6, 2022

Related U.S. Application Data

(60) Provisional application No. 63/170,649, filed on Apr. 5, 2021.

(51) Int. Cl.
| | |
|---|---|
| *G06T 7/00* | (2017.01) |
| *G06V 10/77* | (2022.01) |
| *G06V 10/82* | (2022.01) |
| *G06V 20/69* | (2022.01) |

(52) U.S. Cl.
CPC ........ *G06T 7/0012* (2013.01); *G06V 10/7715* (2022.01); *G06V 10/82* (2022.01); *G06V 20/698* (2022.01); *G06T 2207/30024* (2013.01); *G06T 2207/30096* (2013.01)

(58) Field of Classification Search
CPC ......... G06T 7/0012; G06T 2207/30024; G06T 2207/30096; G06T 7/10; G06T 7/11; G06V 20/698; G06V 10/7715; G06V 10/82; G06V 20/69; C12N 5/0695; A61B 5/7264; G06K 9/46; G16H 30/40; G16H 30/20
See application file for complete search history.

(56) References Cited

U.S. PATENT DOCUMENTS

| | | | | |
|---|---|---|---|---|
| 9,725,766 | B1* | 8/2017 | Potts | G01N 33/56966 |
| 10,262,418 | B2* | 4/2019 | Blumhofer | G06T 7/32 |
| 2005/0041843 | A1* | 2/2005 | Sawyer | A61N 5/1049 382/128 |
| 2009/0202119 | A1* | 8/2009 | Hefti | A61B 5/0059 382/128 |

(Continued)

FOREIGN PATENT DOCUMENTS

| | | | | |
|---|---|---|---|---|
| CN | 113012144 A | * | 6/2021 | G06N 3/04 |
| CN | 118212459 A | * | 6/2024 | A61B 1/00004 |

OTHER PUBLICATIONS

Tomoharu Kiyuna et al. "Evaluating Cellularity Estimation Methods: Comparing AI Counting with Pathologists' Visual Estimates" May 28, 2024, Diagnostics MDPI (Year: 2024).*

(Continued)

*Primary Examiner* — Aaron W Carter
*Assistant Examiner* — Alejandro Hernandez
(74) *Attorney, Agent, or Firm* — Joseph Kolodka (57) ABSTRACT

Methods and systems for processing a scanned tissue section include locating cells within a scanned tissue. Cells in the scanned tissue are classified using a classifier model. A tumor-cell ratio (TCR) map is generated based on classified normal cells and tumor cells. A TCR isoline is generated for a target TCR value using the TCR map, marking areas of the tissue section where a TCR is at or above the target TCR value. Dissection is performed on the tissue sample to isolate an area identified by the isoline.

20 Claims, 8 Drawing Sheets

(56) References Cited

U.S. PATENT DOCUMENTS

| | | | | |
|---|---|---|---|---|
| 2014/0104275 | A1* | 4/2014 | Boettger | A61N 5/1031 |
| | | | | 345/424 |
| 2017/0365053 | A1* | 12/2017 | Yuan | G06T 7/0012 |
| 2018/0328848 | A1* | 11/2018 | Murphy | G01N 33/57484 |
| 2019/0019300 | A1* | 1/2019 | Simpson | G06T 7/40 |
| 2019/0156159 | A1* | 5/2019 | Kopparapu | G06F 18/24147 |
| 2019/0206056 | A1* | 7/2019 | Georgescu | G06T 7/0014 |
| 2019/0223725 | A1* | 7/2019 | Lu | G06N 3/044 |
| 2020/0258223 | A1* | 8/2020 | Yip | G06F 18/21 |
| 2020/0302603 | A1* | 9/2020 | Barnes | G06T 7/0012 |
| 2021/0391061 | A1* | 12/2021 | Berlinger | G06Q 50/22 |
| 2023/0404538 | A1* | 12/2023 | Koshino | A61B 8/463 |
| 2024/0271071 | A1* | 8/2024 | Al-Mardini | C12M 23/16 |
| 2024/0281967 | A1* | 8/2024 | Grimm | G16H 30/40 |

OTHER PUBLICATIONS

Mohan M et al. "Enhanced Deep Learning Model Based Brain Tumor Segmentation Using M-SVM", Jun. 28, 2024, IEEE (Year: 2024).*

Cosatto et al., "A multi-scale conditional deep model for tumor cell ratio counting", InMedical Imaging 2021: Digital Pathology (vol. 11603, p. 1160308), Feb. 2021, pp. 1-13.

Hipp et al., "Computer-aided laser dissection: A microdissection workflow leveraging image analysis tools", Journal of Pathology Informatics, Dec. 2018, pp. 1-9.

Coope et al., "Whole-slide laser microdissection for tumour enrichment", The Journal of Pathology, Feb. 2021, pp. 1-2.

* cited by examiner

TUMOR CELL ISOLINES

RELATED APPLICATION INFORMATION

This application claims priority to U.S. Provisional Patent Application No. 63/170,649, filed on Apr. 5, 2021, incorporated herein by reference in its entirety.

BACKGROUND

Technical Field

The present invention relates to tumor cell detection and classification, and, more particularly, to identifying regions within a slide image that relate to tumor cells of respective densities.

Description of the Related Art

Obtaining a tumor cell ratio, which is a measure of cancer aggressiveness, includes counting a number of cells in the tumor area. For some tissue samples, the number of cells can be in the millions. Counting so many cells is not feasible for a human to perform, and estimation techniques tend to be inaccurate.

SUMMARY

A method for processing a scanned tissue section includes locating cells within a scanned tissue. Cells in the scanned tissue are classified using a classifier model. A tumor-cell ratio (TCR) map is generated based on classified normal cells and tumor cells. A TCR isoline is generated for a target TCR value using the TCR map, marking areas of the tissue section where a TCR is at or above the target TCR value. Dissection is performed on the tissue sample to isolate an area identified by the isoline.

A system for processing a scanned tissue section includes a hardware processor, a micro-dissection machine, and a memory that stores a computer program. When executed by the hardware processor, the computer program causes the hardware processor to locate cells within a scanned tissue, to classify cells in the scanned tissue within the scanned tissue sample using a classifier model, to generate a tumor-cell ratio (TCR) map based on classified normal cells and tumor cells, to generate a TCR isoline for a TCR value using the TCR map, marking areas of the tissue section where a TCR is at or above the TCR value, and to perform dissection on the tissue sample to isolate an area identified by the isoline using the micro-dissection machine.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

To identify a tumor cell ratio (TCR), normal and tumor cells may be automatically counted for a given area of a tissue sample. High-magnification images may be used to show details of individual cells, while lower-magnification images reveal how cells are arranged in larger structures, such as glands. Cancerous cells can be contrasted from healthy cells by their individual cell features, by the way they arrange themselves, or both.

Identifying TCR can help guide the selection of tissue areas for genetic panel tests. Such tests may need a minimum percentage of tumor cells (e.g., at least around 25%) for genetic sequencing to be successful. Because genetic tests are expensive, time-consuming, and destructive, it is important to select a piece of tissue that has enough tumor cells to run the test. Using a marked area of a slide, the tissue can be micro-dissected to isolate the desired area for testing. This micro-dissection can be performed automatically, for example using lasers to isolate a marked area.

While tissue selection may be done manually, for example by visual estimation, human operators may inaccurately estimate TCR, particularly for regions of tissue where the overall TCR is low. However, machine learning models may be used to detect and classify all cells within an area, making it possible to quantitatively calculate the TCR at each position on a slide. Areas may be then determined having TCR above given values. For example, areas may be identified that include at least 30% tumor cells. These areas may be defined by contour lines along which the TCR stays at a constant value (similar to contour showing lines of constant altitude in topographic maps). These contour lines may be referred to herein as "isolines," and may be used to identify regions within which the TCR is at or above a given value.

Using such TCR isolines, a pathologist or technician need not estimate an area of high TCR by eye, making selection of tissue areas more objective and accurate. The identified tissue areas may then be manually cut or may be automatically sent to a micro-dissection machine. Although micro-dissection machines operate from masks and can laser cut areas as small as a single cell, the TCR isolines generated herein can be easily interpreted by both a human and a machine.

The inputs to the machine learning model may include a slide file, for example generated by a whole-slide imaging (WSI) scanner. The slide image may be split into a grid of tiles to best fit the processing hardware. The output may include reports of the locations of all cancerous cells and normal cells, as well as the TCR for each tile, and the aggregated TCR for specified areas or the entire slide. Isolines may be calculated to identify regions where the TCR is at or larger than given values. Visuals can include color scaling for each tile, for example with red indicating a relatively high ratio of tumor cells and blue indicating a low ratio of tumor cells. Each individual tumor cell may be highlighted to indicated where tumor cells are proliferating. Isolines may be drawn as contour line or region hatching overlays with color-coding (or with dash/hatch-style coding) representing the TCR within the area they enclose.

Figure 1:
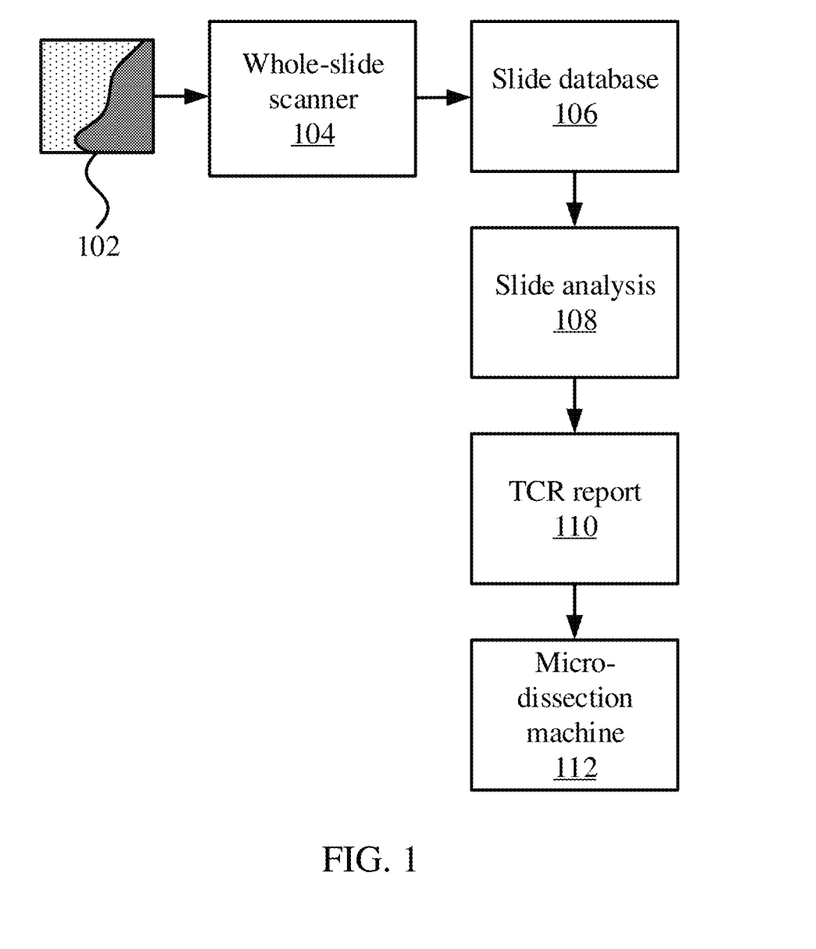
FIG. 1 is a block diagram of the processing of a tissue sample using a whole slide scanner and tumor cell ratio (TCR) isolines, in accordance with an embodiment of the present invention.

Referring now in detail to the figures in which like numerals represent the same or similar elements and initially to FIG. 1, a system for analyzing tissue samples and providing TCR reports is shown. A tissue sample 102 is taken and put on a slide. The slide is scanned by a whole-slide scanner, producing a slide image, which is stored in a slide database 106.

Slide analysis 108 may split each image into processing tiles, which may be analyzed to identify cells and tumor cells according to a regular grid and/or may be determined according to a user's indication of sections of the slide image to focus on.

The slide analysis 108 may generate a report 110 that characterizes the information gleaned from the slide 102, for example including TCR, locations of cancerous cells, etc. This report 110 may be used by medical professionals to help diagnose a patient, to identify a type and extent of a cancer, to identify a course of treatment, etc. The report 110 may further include isoline information that identifies regions of the tissue where the TCR is at or above given values.

Once the report 110 has been generated, it can be used to identify regions of the slide 102 for micro-dissection. For example, a micro-dissection machine 112 may automatically isolate a region having high TCR values based on the isolines, and the isolated region may subsequently be used for genetic testing.

Figure 2:
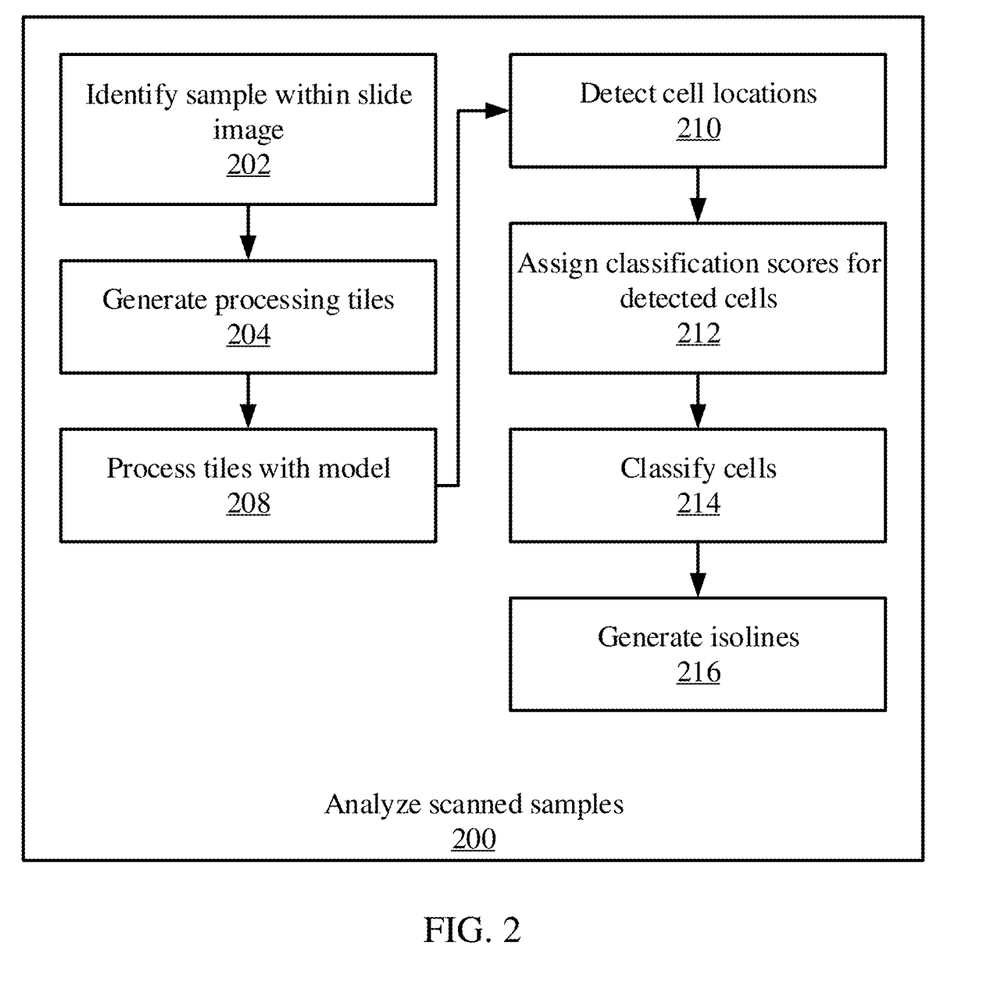
FIG. 2 is a block/flow diagram of a method of analyzing scanned tissue samples to generate TCR isolines, in accordance with an embodiment of the present invention.

Referring now to FIG. 2, a method of performing analysis 200 on a scanned slide is shown. Block 202 identifies a tissue sample within a slide image. This may include, for example, analyzing the whole slide at a relatively low resolution to identify the tissue sample via, e.g., border detection. This may also include identifying marks made by a user that indicate an area of the image to focus on, including marks made using a marker on the slide 102 itself, or marks made digitally on the slide image.

Block 204 generates processing tiles from the identified tissue sample. This may include, for example, generating a regular grid of square regions, though it should be understood that any appropriate subdivision of the image may be used. The user may additionally eliminate a portion of the tiles to prevent further analysis of those regions. The tiles may be used to split the workload among multiple processors or processor cores, thereby increasing the speed of processing.

The processing tiles are supplied as inputs to the neural network model in block 208. The model may be a fully-convolutional neural network trained to detect cells and classify them as normal or cancerous. The architecture of the model can include any number of layers in any relevant arrangement. The fully-convolutional model receives an input image and produces a set of maps as output that can be interpreted to locate and classify cells.

The training of the model produces a trained model with thresholds. The trained model may output maps that can be interpreted, using the trained thresholds, to locate and classify all cells in an input image as being normal or cancerous. In block 210, the output maps and detection threshold are used to identify the location of cells. In block 212, the location of the detected cells and the output maps are used to assign scores to each cell, with the score representing a probabilistic value of the likelihood that a given cell is cancerous. For example, the probabilistic value may range from 0 to 1, and may be is calculated in block 214. A value close to 0 may indicate a high probability of being a normal cell, while at the other end of the range, a value close to 1 may indicate a high probability of being a cancerous cell. A classification threshold obtained during model training may be used to classify each cell as normal, with a probability score below the threshold, or cancer, with a probability score equal or above the threshold). Once the cells have been classified in block 214, block 216 generates isolines. An isoline may be formed by determining a contour along which the TCR is at a constant value. Each isoline may enclose one or more areas of the slide image.

Figure 3:
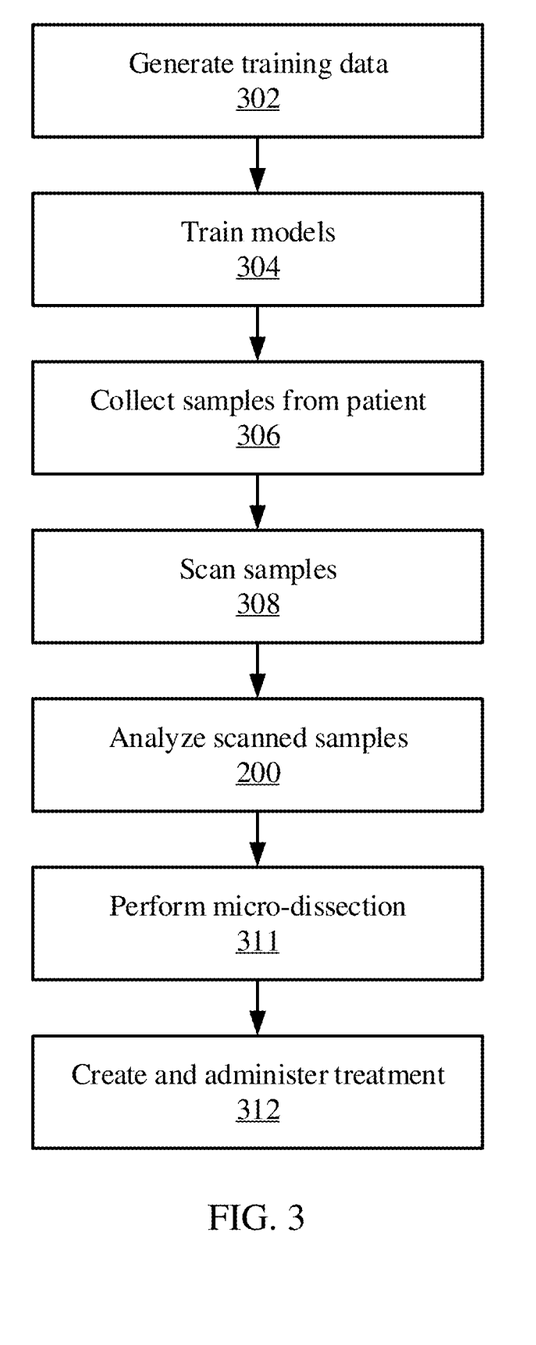
FIG. 3 is a block/flow diagram of a method for training and using a model to classify cells within a tissue sample and to identify isolines within the tissue sample for use in micro-dissection of the tissue sample, in accordance with an embodiment of the present invention.

Referring now to FIG. 3, an overall process is shown. Block 302 generates training data for the machine learning model. This training data may include a set of regions of interest from a set of patients' scanned tissue sample slides, representative of a particular condition as encountered in clinical practice. The regions of interest may be annotated by domain experts, such as pathologists, to identify the location of all cells, including identification of regions that include a tumor. The locations of cells may be labeled by respective points at the center of each cell nucleus, while tumor regions may be delineated by freehand contours. Block 304 trains a fully convolutional neural network model, using the generated training patches. Any appropriate fully convolutional architecture may be used for the model.

Block 306 collects tissue samples from a patient. In some cases, this tissue sample may represent a biopsy sample of suspected cancerous tissue. The tissue sample may be put onto a slide, which may be scanned using whole-slide imaging in block 308.

Block 200 may then analyze the scanned samples, for example as described above in relation to FIG. 2. This analysis may generate isolines that identify regions of particular TCR values. Block 311 performs micro-dissection of the tissue sample, for example to isolate a portion of the tissue sample having a relatively high TCR. This micro-dissected sample may then be used in block 312 to create and administer a treatment to a patient.

For example, block 312 may determine information about the cancerous tissue that can help identify the type of cancer and potential treatments. Administering such a treatment may include performing surgery or administering pharmaceutical substances, such as chemotherapy.

Figure 4:
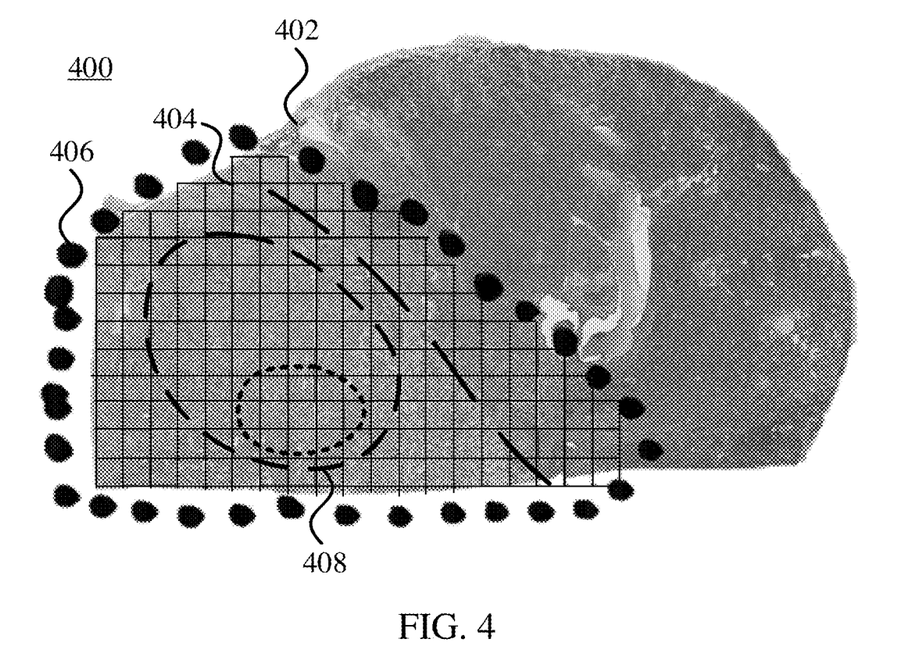
FIG. 4 is an image of a tissue sample that includes isolines at various different TCR values, in accordance with an embodiment of the present invention.

Referring now to FIG. 4, an exemplary slide image 400 is shown after the processing tiles are generated in block 204. The slide image 400 includes the scanned tissue sample 402. A number of tiles 404 have been identified within the image, in this case by applying a grid over the scanned tissue image 402, with pixels falling within each respective grid making up a respective tile. A set of markers 406 are also shown, having been provided by a human operator, to limit the tiles, such that tiles 404 are only determined within a boundary that is established by the markers 406.

Each tile 404 may be separately processed, for example using parallel processing across multiple processors or processor cores. The total number of tiles may be divided by the number of available processing threads to form sets of tiles. Each set may be processed in serial by a respective thread.

Isolines 408 are shown in dashed lines. The differently dashed isolines 408 indicate areas of differing TCR values. Thus, a first isoline (shown with relatively long dashes) may represent regions of a relatively low TCR value (e.g., about 20%), a second isoline (shown with medium dashes) may represent regions of a middle TCR value (e.g., about 25%), and a third isoline (shown with relatively short dashes) may represent regions of a relatively high TCR value (e.g., about 30%).

Figure 5:
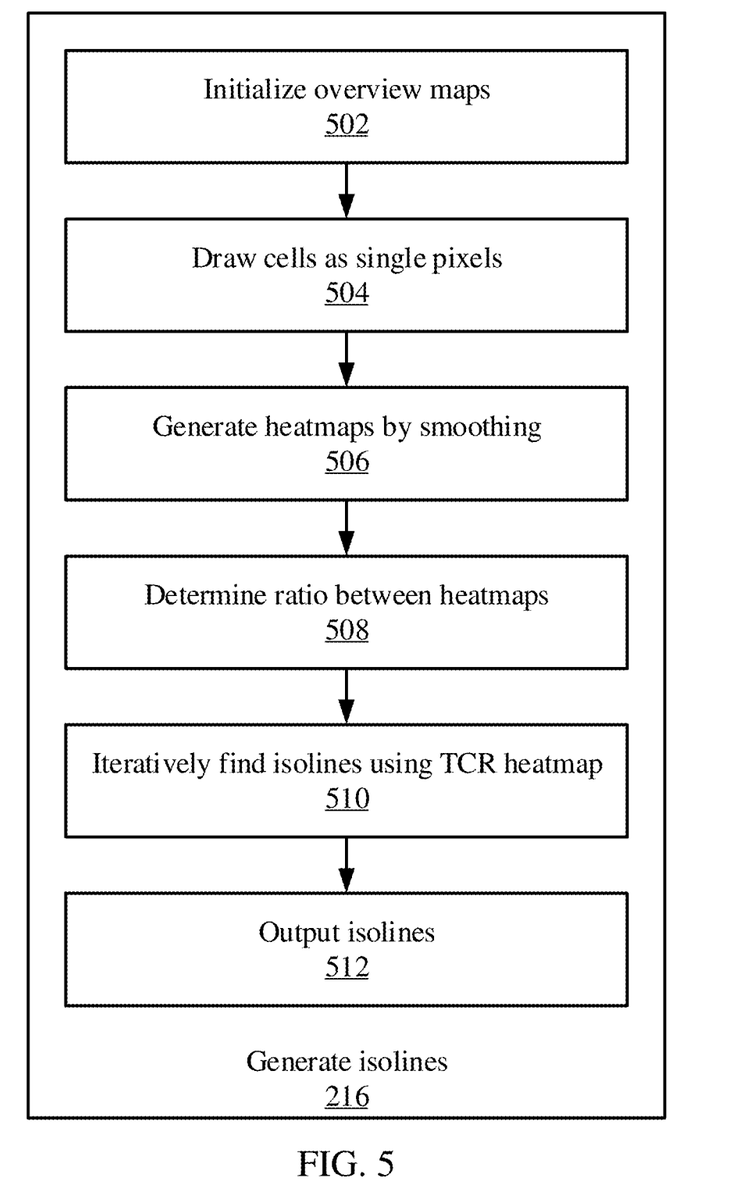
FIG. 5 is a block/flow diagram of a method of generating TCR isolines, in accordance with an embodiment of the present invention.

Referring now to FIG. 5, additional detail is shown on the generation of isolines in block 216. This process is analogous to creating a geographical topographic map, where contour lines (or isolines) represent a path along which the altitude is constant. A slide TCR map can be used to calculate isolines representing a path along which the TCR is at a constant value and that bound areas within which the TCR is at or above that value. Hence the first step is to generate a TCR map.

In an exemplary approach, block 502 initializes (e.g., sets all pixels of the map to 0) two overview maps. Each overview map represents an entire analyzed area of the slide at a lower resolution than the original image. The resolution may be selected by lancing speed against accuracy. Lower resolutions will generate coarse isolines quickly, while higher resolutions will take longer to compute, but will produce smooth and precise isolines. The highest useful resolution is where the size of a cell is about 1 pixel—resolutions above that will not provide any improvement in accuracy. The first overview map is for all cells and the second is for tumor cells only.

Block 504 draws cells onto the maps. Normal cells may be drawn into the first map only, while tumor cells are drawn into both maps. The process of drawing a cell at the highest resolution (e.g., one cell per pixel) may include setting a value of the location of that cell to 1. For lower resolution maps, a fraction is calculated corresponding to the size of the cell and is accumulated at the location of the cell. Block 506 computes respective maps by performing smoothing. Smoothing may be performed by local averaging or by convolving Gaussian kernels with the maps.

Smoothing helps to ensure that the resulting TCR map is not overly noisy, which can prevent extraction of a meaningful contour isoline. Although laser micro-dissection machines can micro-dissect tissue areas directly from mask files in any shape, simple smooth isolines may be generated to encompass regions of high TCR without holes. In cases where a micro-dissection machine is not available, a human technician may perform the dissection and may benefit from a simple, easily interpretable guide.

Smoothing is akin to local averaging, and its intensity can be controlled by the size of the averaging kernel. A small size kernel, such as a 3×3 kernel, will exert a very localized smoothing, resulting in a map that is still very noisy. On the other hand, larger kernel sizes, such as 100×100, would result in a very smooth map, but one that may have lost some of its useful features. The kernel size should contain enough cells to obtain a meaningful averaging, for example between 100 and 400 cells. Thus, with a resolution of 1 pixel per cell, a kernel size of 10×10 to about 20×20 may be used.

Block 508 then determines a ratio between the tumor-cell map and the all-cell map, normalizing the values to a range between zero and one to produce a TCR map. This may be performed by taking a component-wise ratio of the tumor-cells map over the all-cells map.

In block 510, one or more isoline(s) can be iteratively found for one or more given target TCR value(s) by using the smoothed and normalized TCR map as a guide to generate candidate isolines, searching for isolines where the identified TCR is close to a target TCR. Because the TCR map has been smoothed and normalized, its values may no longer be actual TCR values. Also, a smoothed TCR map may include many peaks and valleys and isoline contours may fully encompass valleys, creating holes within the contour. Hence, TCR isolines that correspond to the desired target actual TCR value may be identified.

For example, slide areas that have at least 25% tumor cells may be of interest, with a tolerance of about 1%. A first candidate isoline on the smoothed TCR map may be extracted at this value (25%). Isoline extraction from the smoothed TCR map include thresholding the map at the given value and extracting the contour of connected pixels. This operation may generate several distinct regions of connected pixels, and an isoline may therefore be represented by several contours. Using the isoline contour(s), all cells are selected that fall within the contour(s). The actual TCR of those selected cells may then be calculated.

For example, consider a case where the actual TCR is 22%. This is smaller than the desired TCR of 25%, and outside of the tolerance range. The working value may be increased by an increment dT, such as 5%. The working TCR may then be 30% and thresholding of the TCR map may be repeated to extract an isoline. Calculating the actual TCR, an exemplary value of 27% may be found, which is now larger than the target. The increment may be adjusted, for example by half, and the process may be repeated. Thus, following the example with dT=−2.5%, so the working TCR becomes 30%−2.5%=27.5%. The actual TCR may be calculated again, and in this example may come to 25.5%, which is within the 1% tolerance of the target TCR. This stops the iterative process of block 510, and the isoline may be output in block 512. Block 510 may be repeated for additional isoline values. In some situations, it is possible that this search could continue indefinitely, when the actual TCR stays stable but is not close enough to the target. In this case, a different stopping criterion may be to stop when a minimum value of dT is reached. Isolines may be outputted in the form of a vector of two-dimensional slide coordinates defining its contour, for example into a file having a format that can be used by a micro-dissection apparatus. The isolines may also be drawn onto an image overview of the slide image to visually guide a pathologist or a technician for a manual micro-dissection of the tissue.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

Figure 6:
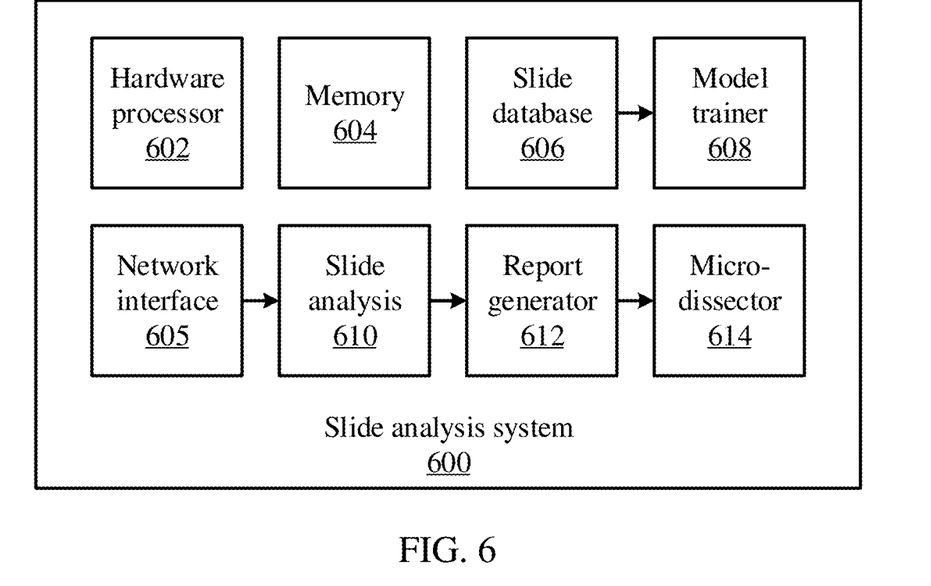
FIG. 6 is a block diagram of a slide analysis system that may identify TCR isolines and that may further use the identified TCR isolines to perform micro-dissection, in accordance with an embodiment of the present invention.

Referring now to FIG. 6, a slide analysis system 600 is shown. The system 600 includes a hardware processor 602 and memory 604. The system 600 may include a number of functional modules, which may be implemented as software that is stored in the memory 604 and that is executed by the hardware processor 602. In some cases, some of the functional modules may be implemented as discrete hardware components, for example in the form of ASICs or FPGAs.

A slide database 606 may be stored in the memory 604, and may be used by a model trainer 608 to train a fully-convolutional model. The slide database 606 may be made up of images that have been scanned and annotated.

A network interface 605 receives a new slide image by any appropriate wired or wireless communications medium or protocol. For example, the new slide image may be received from a whole-slide scanner 104. Any appropriate type of interface may be implemented, including a general purpose computer network interface or a dedicated interface for the whole-slide scanner 104.

The new slide image is processed by slide analysis 610. A report generator 612 uses the output of the slide analysis 610, for example identifying isolines using the output maps and rendering the isolines as an overlay on the image. A micro-dissector 614 can then perform micro-dissection on the sample, using the identified isolines to isolate a portion of the tissue sample having an appropriate TCR.

An artificial neural network (ANN) is an information processing system that is inspired by biological nervous systems, such as the brain. The key element of ANNs is the structure of the information processing system, which includes a large number of highly interconnected processing elements (called "neurons") working in parallel to solve specific problems. ANNs are furthermore trained using a set of training data, with learning that involves adjustments to weights that exist between the neurons. An ANN is configured for a specific application, such as pattern recognition or data classification, through such a learning process.

Figure 7:
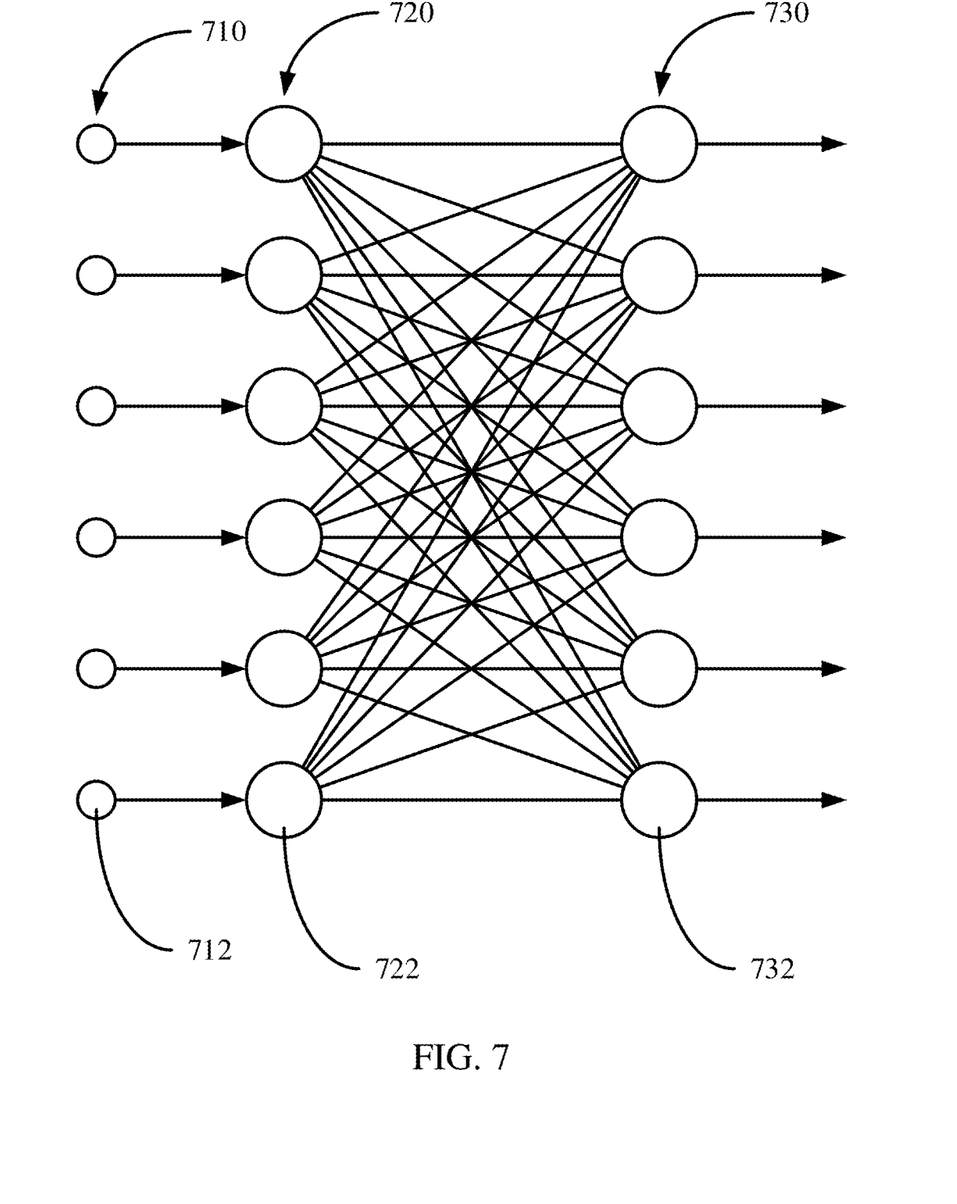
FIG. 7 is a diagram of an exemplary neural network architecture that may be used as part of a neural network model, in accordance with an embodiment of the present invention.
Figure 8:
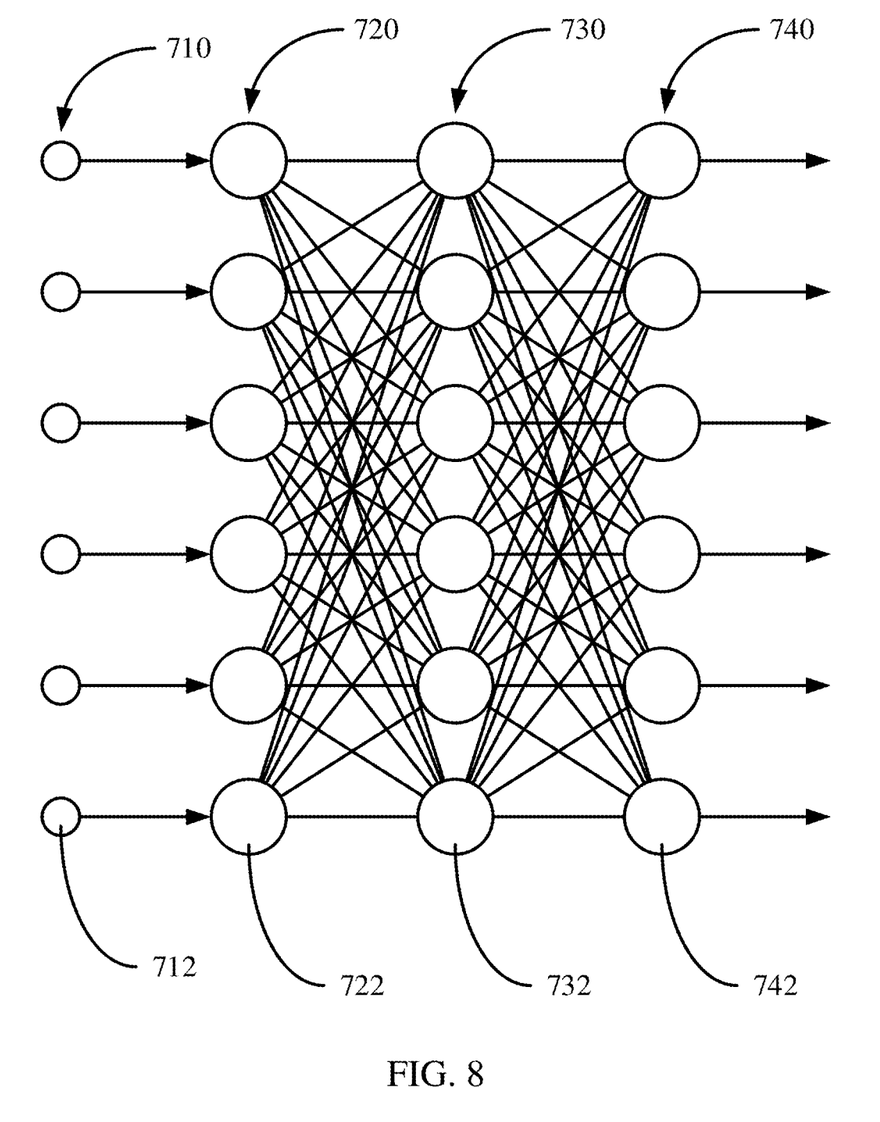
FIG. 8 is a diagram of an exemplary deep neural network architecture that may be used as part of a neural network mode, in accordance with an embodiment of the present invention.

Referring now to FIGS. 7 and 8, exemplary neural network architectures are shown, which may be used to implement parts of the present models. A neural network is a generalized system that improves its functioning and accuracy through exposure to additional empirical data. The neural network becomes trained by exposure to the empirical data. During training, the neural network stores and adjusts a plurality of weights that are applied to the incoming empirical data. By applying the adjusted weights to the data, the data can be identified as belonging to a particular predefined class from a set of classes or a probability that the inputted data belongs to each of the classes can be outputted.

The empirical data, also known as training data, from a set of examples can be formatted as a string of values and fed into the input of the neural network. Each example may be associated with a known result or output. Each example can be represented as a pair, (x, y), where x represents the input data and y represents the known output. The input data may include a variety of different data types, and may include multiple distinct values. The network can have one input node for each value making up the example's input data, and a separate weight can be applied to each input value. The input data can, for example, be formatted as a vector, an array, or a string depending on the architecture of the neural network being constructed and trained.

The neural network "learns" by comparing the neural network output generated from the input data to the known values of the examples, and adjusting the stored weights to minimize the differences between the output values and the known values. The adjustments may be made to the stored weights through back propagation, where the effect of the weights on the output values may be determined by calculating the mathematical gradient and adjusting the weights in a manner that shifts the output towards a minimum difference. This optimization, referred to as a gradient descent approach, is a non-limiting example of how training may be performed. A subset of examples with known values that were not used for training can be used to test and validate the accuracy of the neural network.

During operation, the trained neural network can be used on new data that was not previously used in training or validation through generalization. The adjusted weights of the neural network can be applied to the new data, where the weights estimate a function developed from the training examples. The parameters of the estimated function which are captured by the weights are based on statistical inference.

In layered neural networks, nodes are arranged in the form of layers. An exemplary simple neural network has an input layer 720 of source nodes 722, and a single computation layer 730 having one or more computation nodes 732 that also act as output nodes, where there is a single computation node 732 for each possible category into which the input example could be classified. An input layer 720 can have a number of source nodes 722 equal to the number of data values 712 in the input data 710. The data values 712 in the input data 710 can be represented as a column vector. Each computation node 732 in the computation layer 730 generates a linear combination of weighted values from the input data 710 fed into input nodes 720, and applies a non-linear activation function that is differentiable to the sum. The exemplary simple neural network can perform classification on linearly separable examples (e.g., patterns).

A deep neural network, such as a multilayer perceptron, can have an input layer 720 of source nodes 722, one or more computation layer(s) 730 having one or more computation nodes 732, and an output layer 740, where there is a single output node 742 for each possible category into which the input example could be classified. An input layer 720 can have a number of source nodes 722 equal to the number of data values 712 in the input data 710. The computation nodes 732 in the computation layer(s) 730 can also be referred to as hidden layers, because they are between the source nodes 722 and output node(s) 742 and are not directly observed. Each node 732, 742 in a computation layer generates a linear combination of weighted values from the values output from the nodes in a previous layer, and applies a non-linear activation function that is differentiable over the range of the linear combination. The weights applied to the value from each previous node can be denoted, for example, by $w_1, w_2, \ldots w_{n-1}, w_n$. The output layer provides the overall response of the network to the inputted data. A deep neural network can be fully connected, where each node in a computational layer is connected to all other nodes in the previous layer, or may have other configurations of connections between layers. If links between nodes are missing, the network is referred to as partially connected.

Training a deep neural network can involve two phases, a forward phase where the weights of each node are fixed and the input propagates through the network, and a backwards phase where an error value is propagated backwards through the network and weight values are updated.

The computation nodes 732 in the one or more computation (hidden) layer(s) 730 perform a nonlinear transformation on the input data 712 that generates a feature space. The classes or categories may be more easily separated in the feature space than in the original data space.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method for processing a scanned tissue section, comprising:
    locating cells within a scanned tissue;
    classifying cells in the scanned tissue using a classifier model;
    generating a tumor-cell ratio (TCR) map based on classified normal cells and tumor cells;
    generating a TCR isoline for a target TCR value using the TCR map, marking areas of the tissue section where a TCR is at or above the target TCR value; and
    performing dissection on the tissue sample to isolate an area identified by the isoline.

2. The method of claim 1, wherein the classifier model is a fully-convolutional neural-network model.

3. The method of claim 1, wherein generating the TCR map comprises:
    identifying all cell locations in a first map of the tissue section;

identifying tumor cell locations in a second map of the tissue section;

smoothing the first map and the second map;

generating a TCR map using a component-wise ratio of the second map over the first map.

4. The method of claim 3, wherein the first map and the second map have a resolution of one cell per pixel.

5. The method of claim 3, wherein the first map and the second map have a resolution that is less than one cell per pixel and identifying cell locations and tumor cell locations includes accumulating a fractional value into pixels corresponding to coordinate locations of respective cells.

6. The method of claim 3, wherein smoothing the first map and the second map includes local averaging.

7. The method of claim 3, wherein smoothing of the first map and the second map includes convolving an averaging kernel.

8. The method of claim 7, wherein the averaging kernel is a Gaussian kernel.

9. The method of claim 3, further comprising normalizing the TCR map such that a smallest pixel value is 0 and a largest pixel value is 1.

10. The method of claim 1, wherein the generating the isoline for the target TCR value includes an iterative process that comprises:

setting an isoline on the TCR map using a threshold value;

determining an actual TCR of cells selected by the isoline; and adjusting the threshold TCR value in accordance with a comparison between the actual TCR and the target TCR value.

11. A system for processing a scanned tissue section, comprising:

a hardware processor;

a micro-dissection machine; and a memory that stores a computer program, which, when executed by the hardware processor, causes the hardware processor to:

locate cells within a scanned tissue;

classify cells in the scanned tissue within the scanned tissue sample using a classifier model;

generate a tumor-cell ratio (TCR) map based on classified normal cells and tumor cells;

generate a TCR isoline for a target TCR value using the TCR map, marking areas of the tissue section where a TCR is at or above the target TCR value; and perform dissection on the tissue sample to isolate an area identified by the isoline using the micro-dissection machine.

12. The system of claim 11, wherein the classifier model is a fully-convolutional neural-network model.

13. The system of claim 11, wherein the computer program further causes the hardware processor to:

identify all cell locations in a first map of the tissue section;

identify tumor cell locations in a second map of the tissue section;

smooth the first map and the second map;

generate a TCR map using a component-wise ratio of the second map over the first map.

14. The system of claim 13, wherein the first map and the second map have a resolution of one cell per pixel.

15. The system of claim 13, wherein the first map and the second map have a resolution that is less than one cell per pixel and wherein the computer program further causes the hardware processor to accumulate a fractional value into pixels corresponding to coordinate locations of respective cells to identify cells.

16. The system of claim 13, wherein the computer program further causes the hardware processor to smooth the first map and the second map using local averaging.

17. The system of claim 13, wherein the computer program further causes the hardware processor to smooth the first map and the second map using convolution of an averaging kernel.

18. The system of claim 17, wherein the averaging kernel is a Gaussian kernel.

19. The system of claim 13, wherein the computer program further causes the hardware processor to normalize the TCR map such that a smallest pixel value is 0 and a largest pixel value is 1.

20. The system of claim 11, wherein the computer program further causes the hardware processor to iteratively:

set an isoline on the TCR map using a threshold value;

determine an actual TCR of cells selected by the isoline; and adjust the threshold TCR value in accordance with a comparison between the actual TCR and a target TCR value.

* * * * *